United States Patent
Miya et al.

[11] Patent Number: 5,818,869
[45] Date of Patent: *Oct. 6, 1998

[54] SPREAD SPECTRUM COMMUNICATION SYNCHRONIZING METHOD AND ITS CIRCUIT

[75] Inventors: Kazuyuki Miya, Machida; Roland Go; Hiroyuki Kanaya, both of Yokohama, all of Japan

[73] Assignee: Matsushita Electric Industrial Co., Ltd., Osaka, Japan

[*] Notice: The term of this patent shall not extend beyond the expiration date of Pat. No. 5,757,870.

[21] Appl. No.: 858,146

[22] Filed: May 15, 1997

Related U.S. Application Data

[63] Continuation of Ser. No. 517,408, Aug. 21, 1995.

[30] Foreign Application Priority Data

Aug. 22, 1994 [JP] Japan .................................. 6-196780
Jun. 19, 1995 [JP] Japan .................................. 7-134945

[51] Int. Cl.[6] .............................. H04B 1/707; H04L 7/00
[52] U.S. Cl. ........................................ 375/206; 375/367
[58] Field of Search .................................... 375/200, 206, 375/207, 367, 208; 370/515, 181

[56] References Cited

U.S. PATENT DOCUMENTS 5,132,986  7/1992  Endo et al. .
5,311,544  5/1994  Park et al. ............................... 375/206
5,550,811  8/1996  Kaku et al. .............................. 370/515
5,648,982  7/1997  Durrant et al. .......................... 375/206

FOREIGN PATENT DOCUMENTS 5-327655  12/1993  Japan .

OTHER PUBLICATIONS

Y. Suzuki et al., "A Code Acquisition Scheme for Postdetection RAKE Reception in DS/CDMA Mobile Radios", NNT Radio Communication Systems Laboratories, pp. 2–361 (Jul./1992).

*Primary Examiner*—Stephen Chin
*Assistant Examiner*—Jeffrey W. Gluck
*Attorney, Agent, or Firm*—Ratner & Prestia

[57] ABSTRACT

A synchronizing method and circuit accurately and stably operates a direct spread spectrum multiple access communication system. A signal transmitted by modulating the spreading code with data at the transmission side is sampled by a signal of n times (n: 1 or larger integer) the clock speed of the spread spectrum signal at the reception side, and the correlation is detected by a digital matched filter. Consequently, the detection output in every sample in the symbol period is compared with the envelope detection output determined in every sampling period, and the sample positions for a specific number of determined samples are stored in the descending order of the output. The number of times of storage of large sample positions in the stored detection output is counted in every symbol period, and the position of the largest number of storage times is detected as the peak position. From this peak position, capturing or holding the symbol period, and setting of the reception window position results.

5 Claims, 13 Drawing Sheets

SPREAD SPECTRUM COMMUNICATION SYNCHRONIZING METHOD AND ITS CIRCUIT

This application is a continuation of application Ser. No. 08/517,408, filed Aug. 21, 1995, currently pending.

BACKGROUND OF THE INVENTION

(1) Field of the invention

The present invention relates to a synchronizing method and circuit for use in direct sequence spread spectrum multiple access (SSMA) communication used in mobile communications such as digital car telephone and portable telephone systems.

(2) Prior Art

Spread spectrum is a type of communication which transmits signals by spreading the spectrum of an information signal to a sufficiently wide band as compared with the original information band width. Multiple access communication refers to simultaneous communication of plural stations in the same band.

In the direct sequence spread spectrum method of modulating data, by multiplying the spread series code directly by an information signal, generally, binary codes such as M series and Gold series, known as spread spectrum series codes are used. As a self-correspondence waveform, one peak is detected for one symbol (generally corresponding to one bit of an information signal).

In mobile spread spectrum communications, when the delay spread of a radio wave by multipath propagation, reached through various propagation paths, is greater than the clock width, the correlation is detected at the reception side by an inverse spread, and the radio wave is separated into plural delay waves. By combining these plural delay waves, a path diversity effect is obtained.

In the spread spectrum communication system, in order to extract the information by inverse spread at the reception side, the phase of the spread signal used at the transmission side is estimated from the reception signal, and a replica of the phase is generated. This is known as synchronization, and time axis estimation (phase estimation) of the spread spectrum signal is necessary. The phase difference between the spread spectrum signal contained in the reception signal and the diffusion signal generated in the reception signal must be kept in an extremely small range.

The problem of synchronization is divided into two processes, that is, a process of capturing (or initial synchronizing, leading in, rough synchronizing), and a process of holding (or following, tracking, precision synchronizing). Unless the diffusion signal is within a phase difference range of ±1 clock, usually, the value of self-correlation is not obtained. Therefore, it is first required to capture the signal so that the phase difference of the input spread spectrum signal and local spread spectrum signal may be settled within a range smaller than ±1 clock, and then hold these signals in perfect synchronization. Various methods have been researched and developed for the synchronizing system in the direct spread spectrum system, and the method of capturing and holding the synchronizing action by using a digital matched filter after lowering the carrier band to the base band has become important with the recent progress in this area.

Incidentally, when signals of plural stations are multiplexed and transmitted through multipath propagation, various peak values are obtained at various sample points as the detection outputs of the reception wave. Its main cause is the effect of the mutual correlation by multiplexing in various phases of the signals modulated by different spread codes in the reception signals. As a result, in the case of multiplexed spread spectrum communication of many stations in multipath conditions, the peak position of the envelope detection output changes significantly when spread inversely at the reception side. Therefore, it is difficult to obtain a stable central window position by averaging the initial mode, and even in the stationary mode the possibility of coincidence of peak position and central window position is low, so that the clock shift of the central window position counter always occurs with high probability. Accordingly, correct symbol synchronization cannot be obtained, and normal data decoding is not realized.

SUMMARY OF THE INVENTION

The invention is intended to solve these conventional problems, and it is an object thereof to present an excellent spread spectrum communication synchronizing method and device, capable of capturing and holding the symbol synchronization easily, accurately, and stably.

To achieve the object, in the invention, at the time of direct spread spectrum multiple access communication, the signal modulating the spread code by transmission data is sampled by a signal of n times (n: 1 or larger integer) the clock speed of the spread spectrum signal. The correlation is detected by a digital matched filter, the detection output in every sample in the symbol period is compared from the envelope detection output determined in every sampling period, the sample positions are stored for a specific number of determined samples, the number of times of storage of large sample positions in the stored detection output is counted in every symbol period, and the position of the largest number of times of storage is detected as the peak position.

Therefore, according to the invention, even in the case of i) spread spectrum communication by multiplexing many stations in multipath conditions and ii) drastic changes of the maximum peak position of the envelope detection output in inverse spread at the reception side, stable and accurate symbol synchronization can be captured and held, and the reception window position can be set, so that excellent spread spectrum multiple access communication is realized.

DESCRIPTION OF THE PREFERRED EMBODIMENTS (Embodiment 1)

Figure 1:
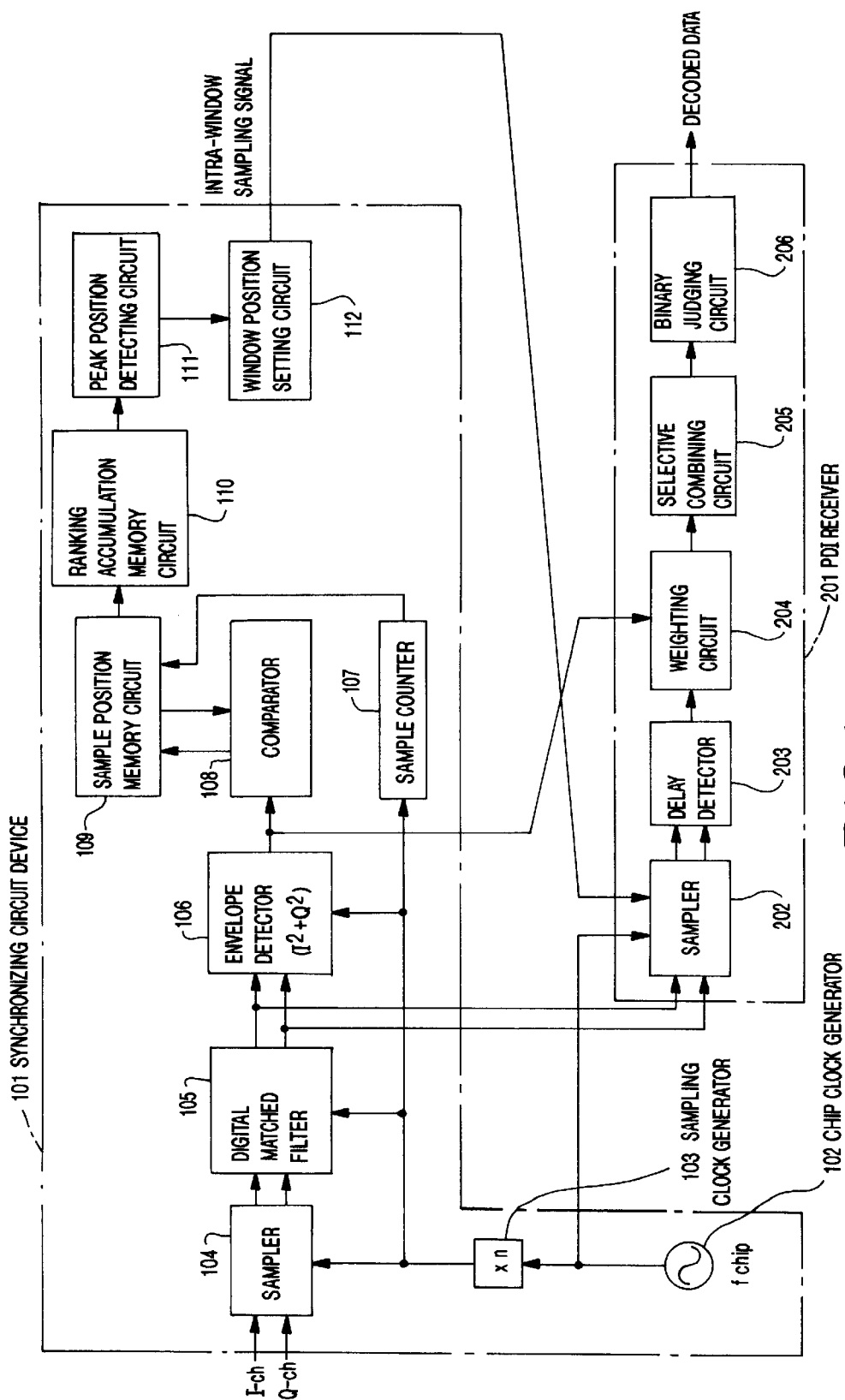
FIG. 1 is a block diagram of synchronizing circuit device and PDI receiver in embodiment 1 of the invention.

FIG. 1 is a block diagram of a synchronizing circuit device and PDI receiver in embodiment 1 of the invention. In FIG. 1, reference numeral 101 denotes the entire synchronizing circuit, 102 is a clock generator for generating a clock of the spread spectrum signal, 103 is a sampling clock generator for generating a sampling clock of n times (n: 1 or larger integer) the clock speed, 104 is a sampler for sampling spread spectrum signals by the sampling clock, 105 is a digital matched filter for detecting correlation of the spread signals, 106 is an envelope detector for detecting an envelope in every sampling period of the signals detected for correlation, 107 is a sampling counter for counting the sampling clocks, 108 is a comparator for comparing the magnitude of the detection output in every sample in the symbol period, 109 is a sample position memory circuit for storing the sample position (phase) for a predetermined number of samples in descending order of magnitude of detection the output, 110 is a ranking accumulation memory circuit for counting and storing the number of times storage of the large sample position in the stored detection output in every symbol period areas, 111 is a peak detection circuit for detecting the sample position of the largest number of times of storage (the largest count number) as the peak position, and 112 is a window position setting circuit for capturing and holding the symbol synchronization from the peak position (phase) and setting the reception window position.

Reference numeral 201 denotes a PDI receiver, 202 is a sampler for sampling the signal necessary for decoding, from the outputs from the matched filter 105 by using a sample signal in the window, 203 is a delay detector for detecting the delay of the sampling signal, 204 is a weighting circuit for weighting the delay detection output depending on the degree of reliability, 205 is a selective combining circuit for diversity combination, and 206 is a binary judging circuit for obtaining decoded data.

The operation of this embodiment is described below. At the transmission side, for signals I, Q transmitted by modulating spread codes with data, a sampling signal having a speed n times (n: 1 or larger integer) the clock, generated by the chip clock generator 101, is generated in the sampling clock generator 103. Sampling by the sampler 104 using this signal, the correlation is detected by the digital matched filter 105, and the detection output by every sampling period is determined by the envelope detector 106. This sampling signal is counted in every symbol period by the sample counter 107 which, in the initial phase is an arbitrary counter and recycles in the symbol period, and the value is transmitted to the sample position memory circuit 109.

Figure 2:
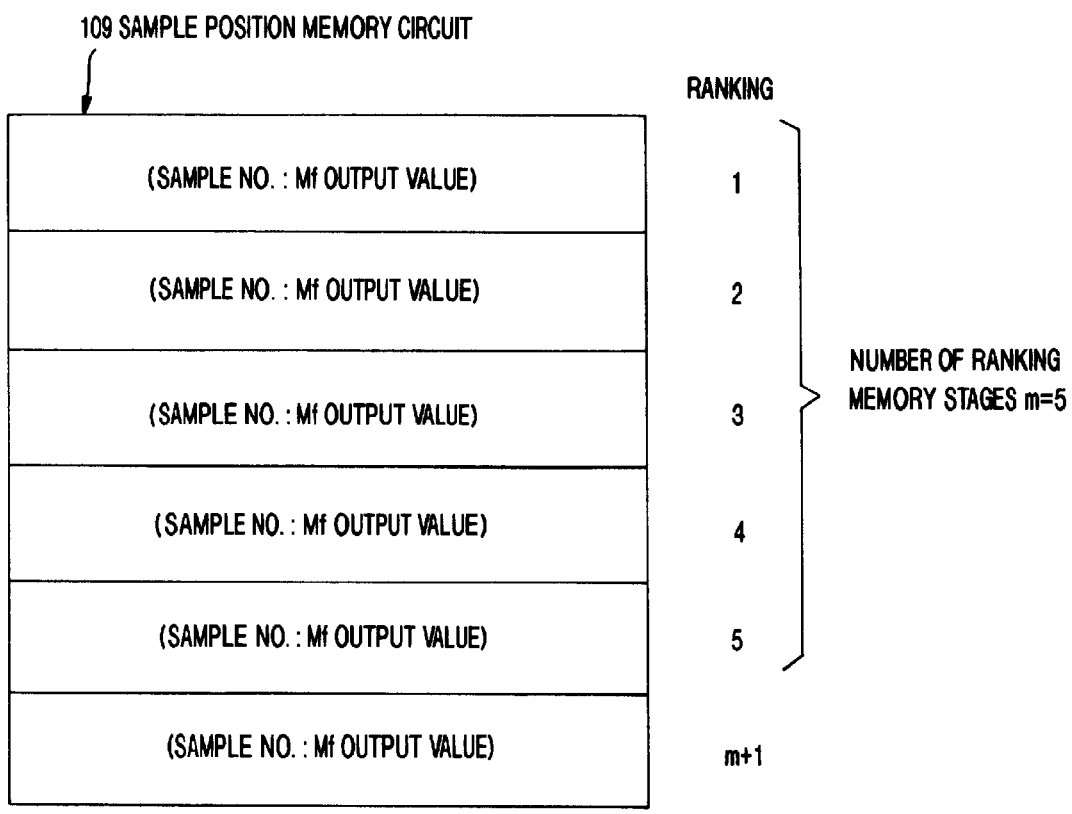
FIG. 2 is a schematic diagram showing the constitution of a sample position memory circuit in embodiment 1.

The comparator 108 compares the magnitude of the detection output in every sample period of one symbol, and the sample positions (phases) for a predetermined number of samples in the descending order of magnitude are stored in the sample position memory circuit 109. FIG. 2 shows a structural example of the sample position memory circuit 109. In this example, it is designed to stored five large samples in the detection output among the samples in one symbol period. In addition, the detection output for comparison (called MF output) is stored at the same time. For example, if the number of stages of ranking memory is m, then m=5 in this case. The stored sample position of the large detection output is sent out and counted in the ranking accumulation memory circuit 110 in every symbol period.

Figure 3:
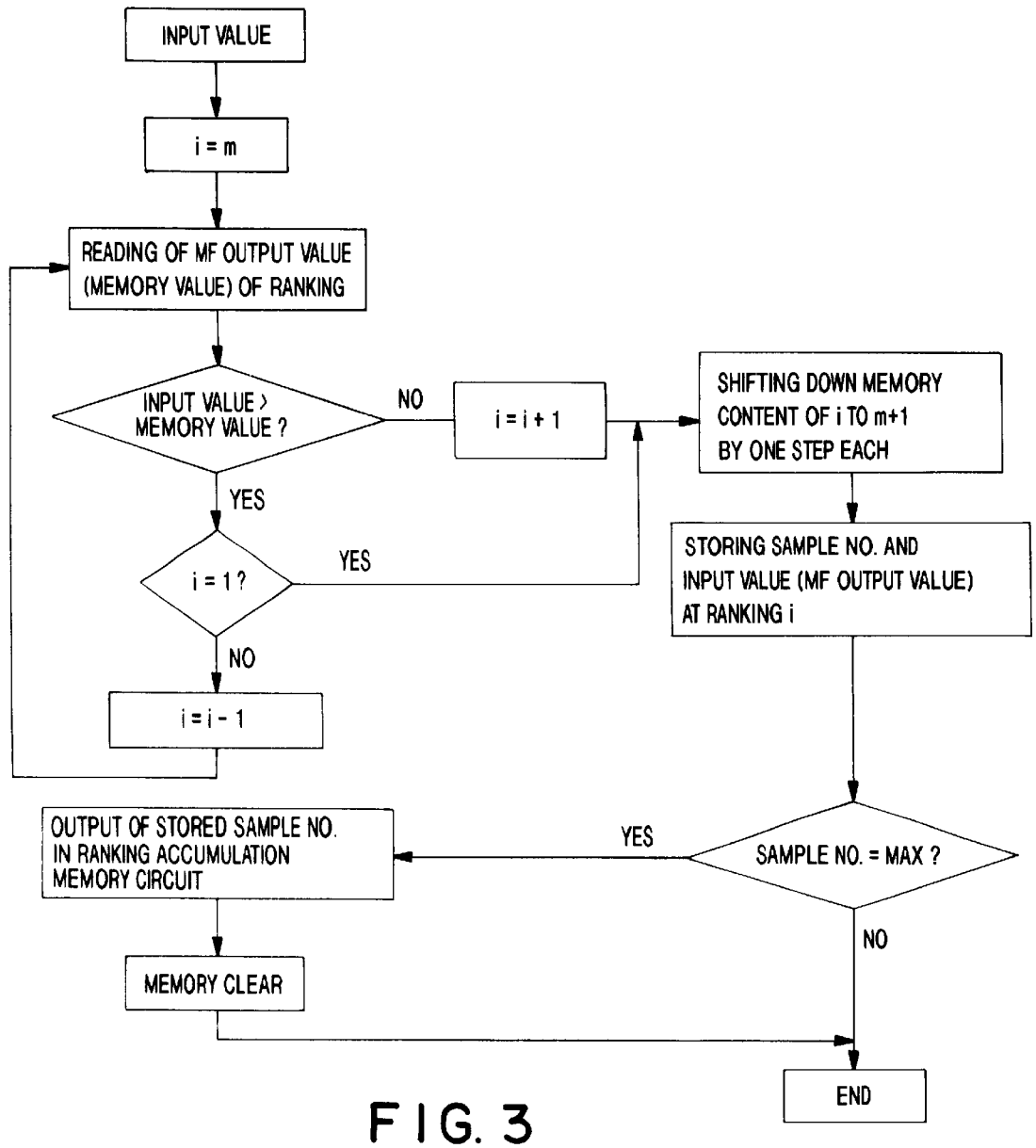
FIG. 3 is a flow chart showing the ranking and transmitting procedure in embodiment 1.

The ranking and transmitting procedure is shown in a flow chart in FIG. 3. The input values ranked from the largest detection output in the comparator 108 are compared with the MF output value (memory value) stored at ranking i in the sample position memory circuit 109. When the input value is the same as, or smaller than, the memory value, 1 is added to the ranking i and the memory content of ranking positions from i to m+1 of the sampling position memory circuit 109 are each shifted down by one step, and a sample number and the input value at this time are newly stored as MF output value in the ranking position 1. When the input value is larger than the memory value, it is judged if i=1 or not, and when i=1 the memory content at each ranking position of the sampling position memory circuit 109 is shifted down by one step each, and the sample number and the input value at this time are newly stored as the MF output value in the ranking position i=1. If i−1, such as i-1, the MF output value of the ranking i−1 is read, and the step after comparison with the input value is repeated.

The memory content at the ranking position i of the sampling position memory circuit 109 is rewritten, and when the new sample number at this time is Max (i.e. equal to the maximum value of the cyclic sample counter 107 of one symbol period), the stored sample number is sent out into the ranking accumulation memory circuit 110, and the memory content of the sample position memory circuit 109 is cleared to be ready for next output from the comparator. When the rewritten sample number is not equal to Max, the above operation is repeated by the next output from the comparator.

Figure 4:
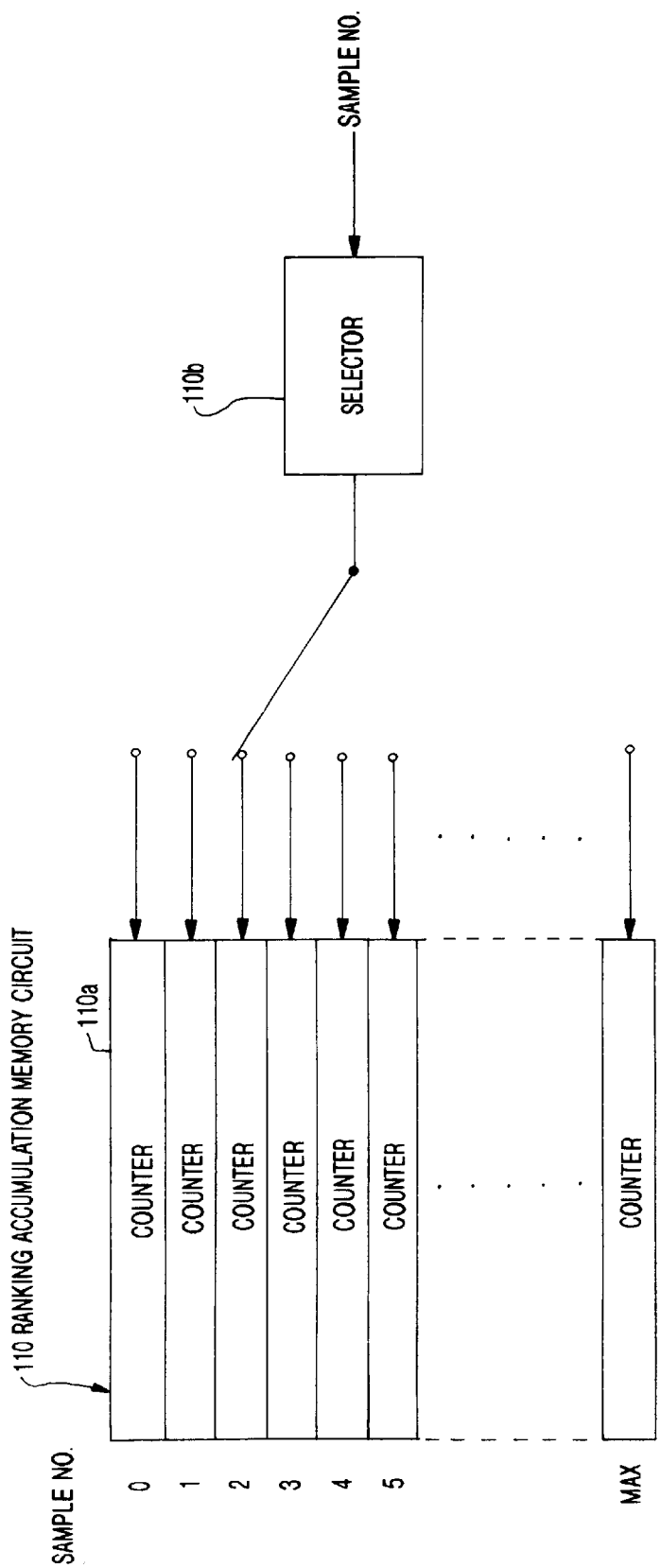
FIG. 4 is a block diagram showing the constitution of a ranking accumulation memory circuit in embodiment 1.

FIG. 4 shows an example of ranking storage memory circuit 110. A selector 110b is driven by a sample number sent from the sample position memory circuit 109, and the corresponding sample number is added to the specified counter 110a, and is counted up.

Referring to FIG. 1, the peak position detection circuit 11 detects the sample position (phase) of the largest number of memories in the ranking storage memory 110, that is, the largest number of count, as the peak position, and the symbol synchronism is captured and held from this peak position in the window position setting circuit 112. As a result, if the maximum peak position of the envelope detection output by inverse spread at the reception side is changed drastically, a stable symbol synchronism can be captured and held. In this example, moreover, for setting the reception window position necessary for diversity reception such as Rake reception and PDI reception, an intra-window sampling signal is sent out from the window position setting circuit 112.

On the other hand, in the PDI receiver 201, the sampler 202 samples the signals necessary for decoding the digital matched filter outputs, by using the intra-window sampling signal, and the detection output by the delay detector 203 is weighted by the degree of reliability in the weighting circuit 204, and combined by diversity in the selective combining circuit 205, and decoded data is sent out by the binary judging circuit 206.

Thus, according to the embodiment, from the envelope detection output determined in every sampling period, the size of the detection outputs in the symbol period is compared. The sample position (phase) of a large output is stored for a specific number of samples, the number of times of storage of sample position is counted in every symbol period, and the sample position of the largest number of times of storage (largest number of count) is detected as the peak position. Thus, if the maximum peak position of the envelope detection output changes drastically, capturing and holding of stable and accurate symbol synchronism, and setting of the reception window position can be done. Therefore, the symbol synchronism can be acquired and held easily, accurately, and stably, so that an excellent spread spectrum multiple access communication can be achieved.

(Embodiment 2)

Embodiment 2 of the invention is described below.

In spread spectrum multiple access communication, while the state of the propagation path varies with the time and place moment after moment, the number of stations using the same band varies. Accordingly, the effect of mutual correlation changes significantly. This means that the difficulty of capturing and holding synchronism varies with the time and place. In particular, in the condition of significant interference or noise, it is possible that the phase of symbol synchronism is not stable over time.

Figure 5:
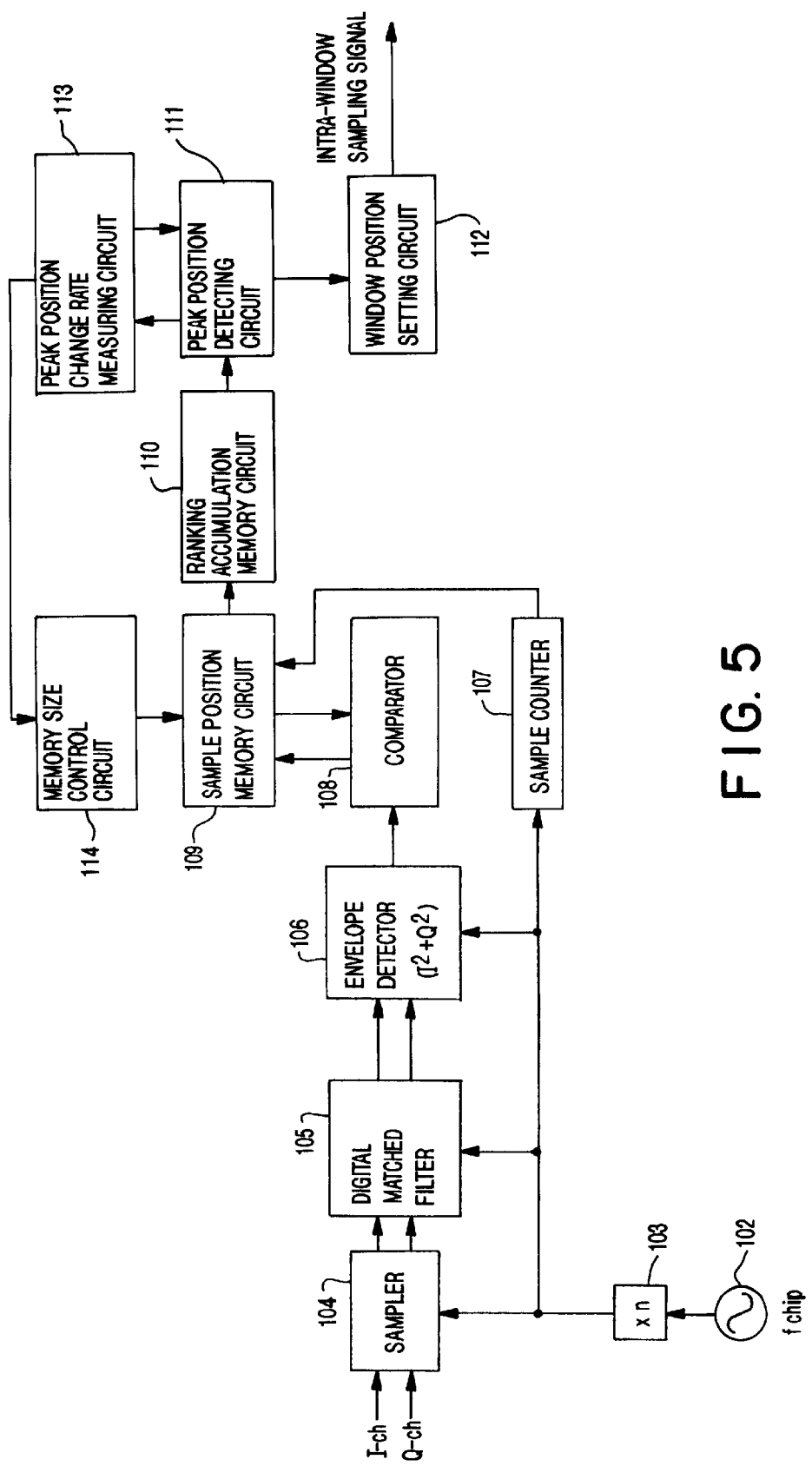
FIG. 5 is a block diagram of a synchronizing circuit device in embodiment 2 of the invention.

This embodiment is intended to capture and hold synchronism accurately and stably in operation regardless of the conditions, and a block diagram thereof is shown in FIG. 5. In FIG. 5, the synchronizing circuit device 101 in embodiment 1 and FIG. 1 is further combined with a peak position change rate measuring circuit 113 for changing the number of sample positions to be stored in the sample position memory circuit 109 depending on the time change rate of the peak position, or the number of sample positions to be counted in every sample period in the ranking accumulation memory circuit 110, and a memory size control circuit 114. The other parts are the same as in FIG. 1 and are identified with the same reference numerals. The PDI receiver 201 is not shown in FIG. 5.

The operation of this embodiment is described below. The basic operation is same as in embodiment 1. In this embodiment, in addition, the time change rate of the peak position is measured in the peak position change rate measuring circuit 113 from the output of the peak position detecting circuit 111. For example, when the peak position is stable, the transmission path condition is considered to be favorable, and the number of ranking memory stages m stored in the sample memory circuit 109 is unchanged or decreased by controlling the memory size control circuit 114. When the peak position is unstable, the transmission path condition is poor, and many unnecessary peaks occur. In this case, the probability of the peak value of the truly desired peak position becoming the size within the number of memory stages is low, hence it is considered unstable, and it is controlled by the memory size control circuit 114 to increase the number of ranking memory stages m.

In this case, as the method of control, aside from increasing the number of ranking memory stages m, the number of ranking memory stages is fixed at m, and the number of sample positions to be counted in every symbol period may be varied in the ranking accumulation memory circuit 110. In any method, it is effective that the capturing and holding of synchronism may operate accurately and stably.

(Embodiment 3)

Figure 6:
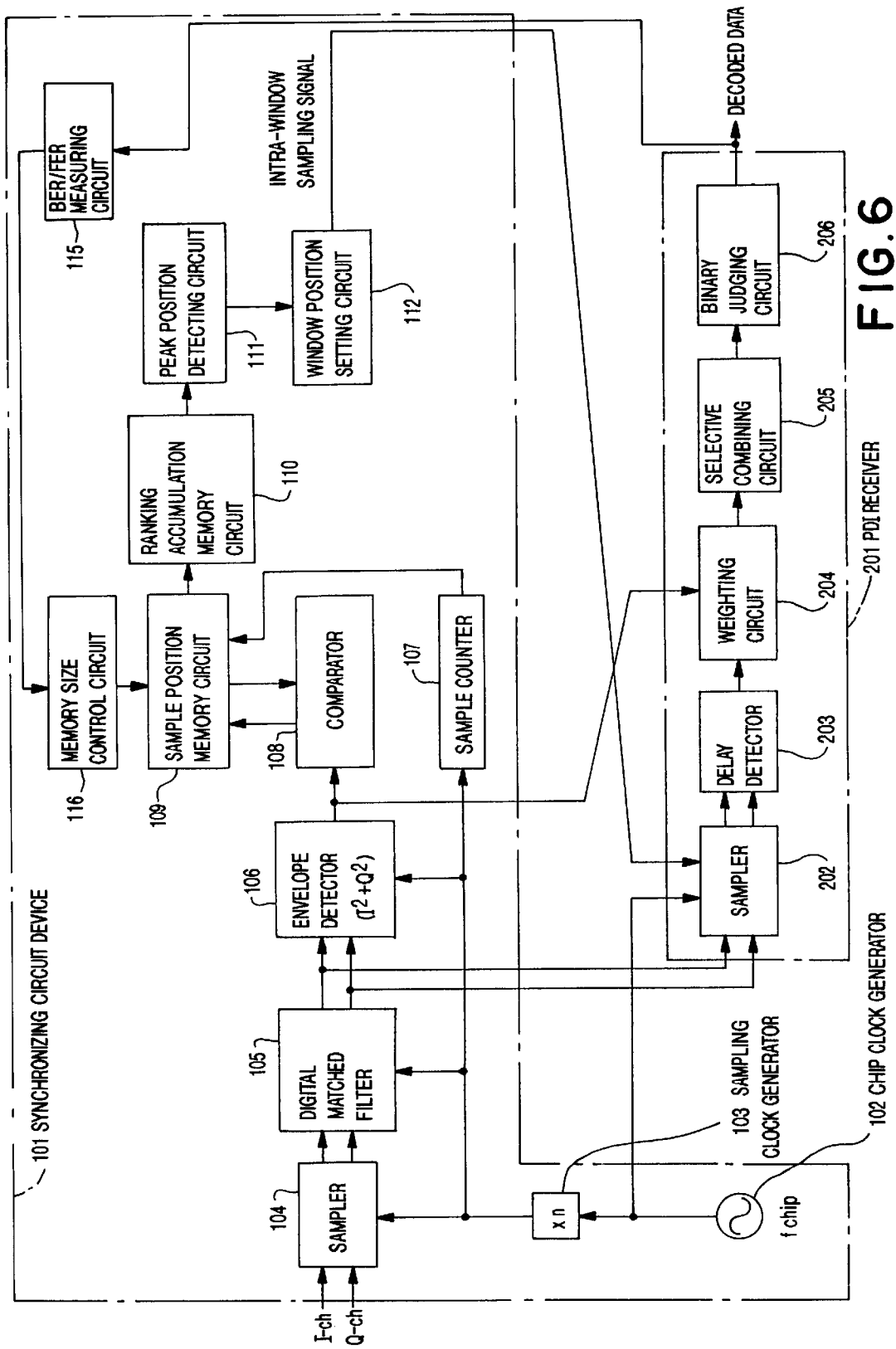
FIG. 6 is a block diagram of a synchronizing circuit device and PDI receiver in embodiment 3 of the invention.

Embodiment 3 of the invention is described below. In spread spectrum multiple access communication, in the condition of large interference or noise, there is a possibility that the phase of symbol synchronization is not stabilized in time, or possibly stabilized in the wrong phase. This embodiment is intended to operate so as to capture or hold the synchronization accurately and stably, and its block diagram is shown in FIG. 6. In FIG. 6, the synchronizing circuit device 101 of FIG. 1 is further combined with a BER (bit error rate)/FER (frame error rate) measuring circuit 115 for varying the number of sample positions to be stored in the sample position memory circuit 109 depending on the error rate of decoded data, BER or FER, or the number of sample positions for counting in every symbol period in the ranking accumulation memory circuit 110, and a memory size control circuit 116. As the demodulator, the PDI receiver 201 shown in FIG. 1 is used, and the decoded data decoded by this PDI receiver 201 is entered in the BER/FER measuring circuit 115. The other parts are same as the parts in FIG. 1 and are hence identified with the same reference numerals.

Figure 13:
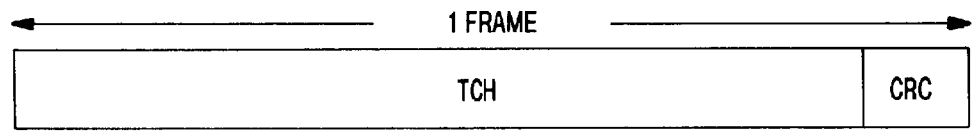
FIG. 13 is a schematic diagram showing an example of frame constitution in the foregoing embodiments.

The operation of the embodiment is described below. The basic operation is same as in embodiment 1. In the case of transmission in a frame unit as shown in FIG. 13, an error detection code such as Cyclic Redundancy Clock (CRC) is added to the transmission data (TCH), and by detecting CRC errors from the decoded data at the reception side, frame error can be detected. On the basis of the error rate measured in the BER/FER measuring circuit 115, for example, when the peak position is stabilized, the transmission path condition is considered to be satisfactory, is and it is controlled by the memory size control circuit 116 to keep unchanged or decrease the number of ranking memory stages m to be stored in the sample position memory circuit 109. When the peak position is unstable, the transmission path condition is poor, many undesired peaks are formed, and the probability of the peak value of the peak position truly desired to be determined becoming the size within the number of memory stages is low, and hence it is considered unstable, and it is controlled by the memory size control circuit 116 so as to increase the number of ranking memory stages m.

In this case, too, aside from increasing the number of ranking memory stages m, as the control method, the number of ranking memory stages may be fixed at m, and the number of sample positions to be counted in every symbol period may be varied in the ranking accumulation memory circuit 110. In any method, by controlling on the basis of the error rate of decoded data, the possibility of the phase of symbol synchronism not stabilized in time or the possibility of stabilizing in the wrong way phase may be decreased, and it is effective to operate to capture and hold the synchronism accurately and stably.

(Embodiment 4)

Figure 7:
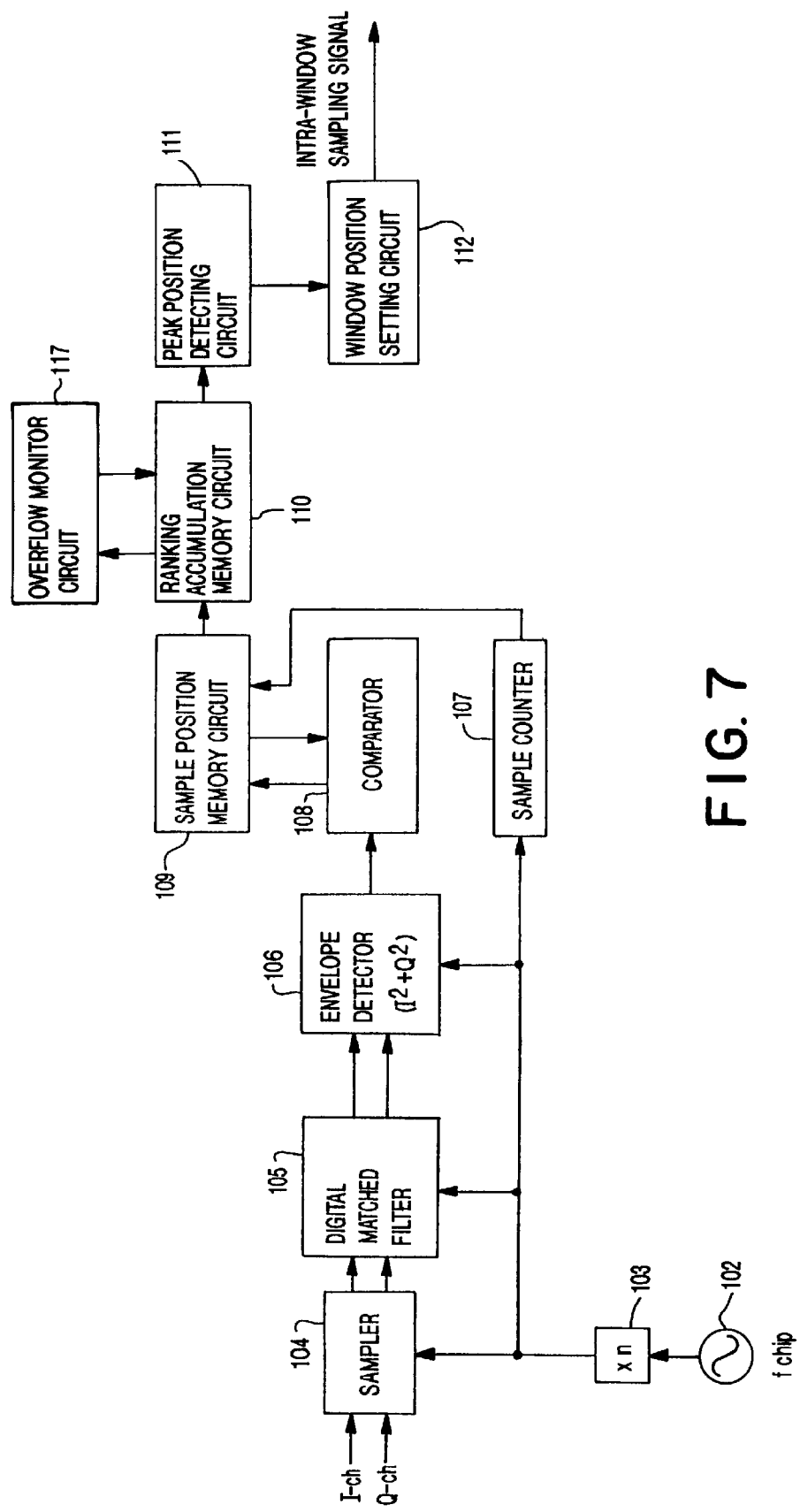
FIG. 7 is a block diagram of a synchronizing circuit device in embodiment 4 of the invention.

Embodiment 4 of the invention is described below. The large sample position in the envelope detection output is sent out and counted in the ranking accumulation memory circuit 110 in every symbol period. However, when the ranking accumulation memory circuit 110 is constituted as shown in FIG. 4, the size of the counter is limited, and when overflowing, correct result is not obtained in the peak position detecting circuit 111 in a later stage. In this embodiment, therefore, as shown in FIG. 7, in order to prevent overflow of the ranking accumulation memory circuit 110, an overflow monitor circuit 117 is added to the synchronizing circuit device 101 in FIG. 1. The other parts are the same as the parts in FIG. 1 and are identified with the same reference numerals. The PDI receiver 201 is not shown in FIG. 7.

The operation of the embodiment is described below. The basic operation is the same as in embodiment 1. The overflow monitor circuit 117 monitors the counting number of every sample of the ranking accumulation memory circuit 110, and when the maximum value of the counting number exceeds a certain value, a determined value is subtracted from each counting number of all samples stored. As a result, overflow of the ranking accumulation memory circuit 110 is prevented, and it is effective to operate to capture or hold the synchronism accurately and stably.

(Embodiment 5) Embodiment 5 of the invention is described below. At the time of initial synchronization capture, the peak position changes drastically in every symbol, but after the lapse of a certain time, generally it gradually stabilizes to converge on the peak position to be determined. Therefore, in the synchronized state, stable operation is possible if ranking is not accumulated in all symbol periods.

Figure 8:
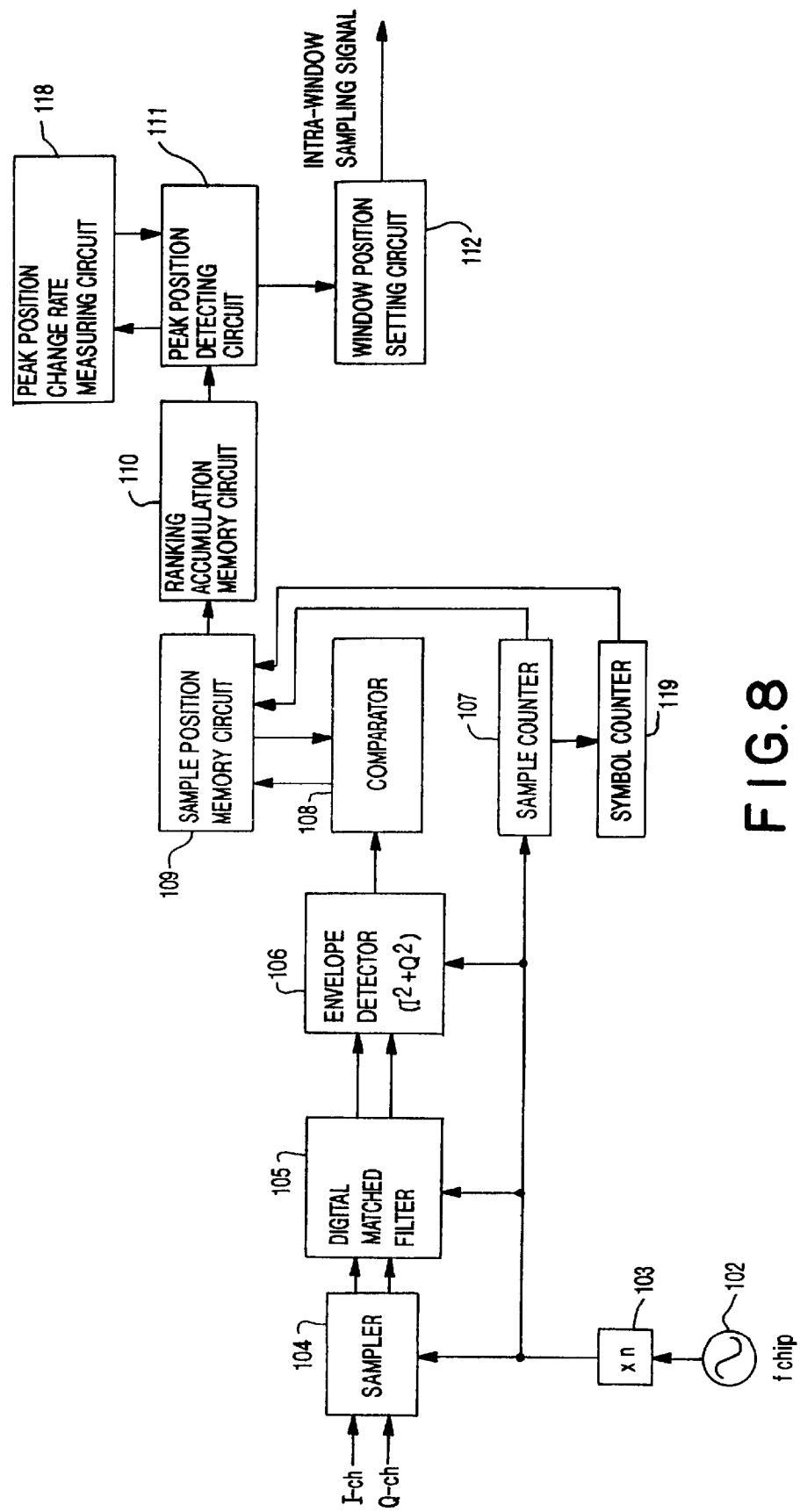
FIG. 8 is a block diagram of a synchronizing circuit device in embodiment 5 of the invention.

In the embodiment, accordingly, as shown in FIG. 8, the initial mode and stationary mode are distinguished by the time change rate of peak position in the synchronizing circuit device 101 of FIG. 1, and a peak position change rate measuring circuit 118, for changing the timing (period) of counting the sample position stored in the sample position memory circuit 109 in the ranking accumulation memory circuit 110, and a symbol counter 119 are added. The other parts are the same as the parts in FIG. 1 and are identified with the same reference numerals. The PDI receiver 201 is not shown in FIG. 8.

The operation of the embodiment is described below. The basic operation is same as in embodiment 1 of FIG. 1. From the output of the peak position detecting circuit 111, the time change rate of the peak position is measured in the peak position change rate measuring circuit 118. The initial mode is distinguishing when the change rate is large and the stationary mode is distinguished when the change rate is small. In the initial mode, sample positions (phases) for a specific number of samples stored in the sample position memory circuit 109 are sent out and counted in the ranking accumulation memory circuit 110 in every symbol period. By contrast, in the stationary mode, the period for sending out and counting is extended from one symbol to several symbols. At this time, on the basis of the signal of the sample counter 107, a timing signal is created in the symbol counter 119, and this signal is sent to the sample position memory circuit 109. In the stationary mode, it is not always necessary to fix the period, but it may be variable depending on the change rate of the peak position. In this method and constitution, it is possible to decrease the number of operations of the ranking accumulation memory circuit 110 in the stationary mode, which effectively saves current consumption in the hardware (Embodiment 6)

Figure 9:
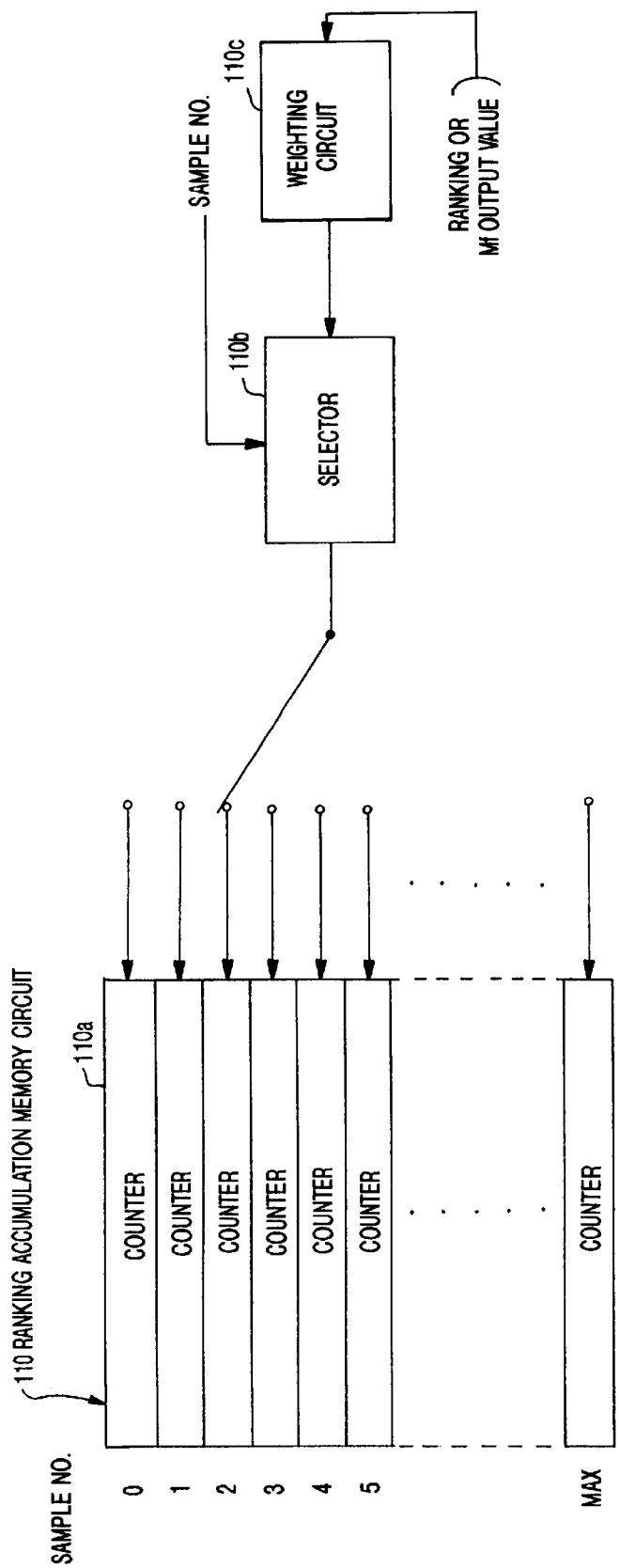
FIG. 9 is a block diagram showing an example of ranking accumulation memory circuit in embodiment 6 of the invention.

Embodiment 6 of the invention is described below. In this embodiment, in order to enhance the performance of capturing and holding the synchronization, when counting the sample position stored in the sample position memory circuit 109 in the ranking accumulation memory circuit 110, in embodiment 1, the constitution of the ranking accumulation memory circuit 110 is modified as shown in FIG. 9 to count by weighting in consideration of the magnitude or order (ranking) of the detection output.

That is, from the sample position memory circuit 109, in addition to the sample position, the ranking or the detection output value (MF output value) is also sent. In the ranking accumulation memory circuit 110, as shown in FIG. 9, the selector 110b is changed over by the sample number, and further the value converted in the weighting circuit 110, depending on the ranking or magnitude of the detection output value is added to the counter 110a. As a result, the convergence time for synchronization capture can be shortened; and the performance is enhanced.

(Embodiment 7)

Figure 10:
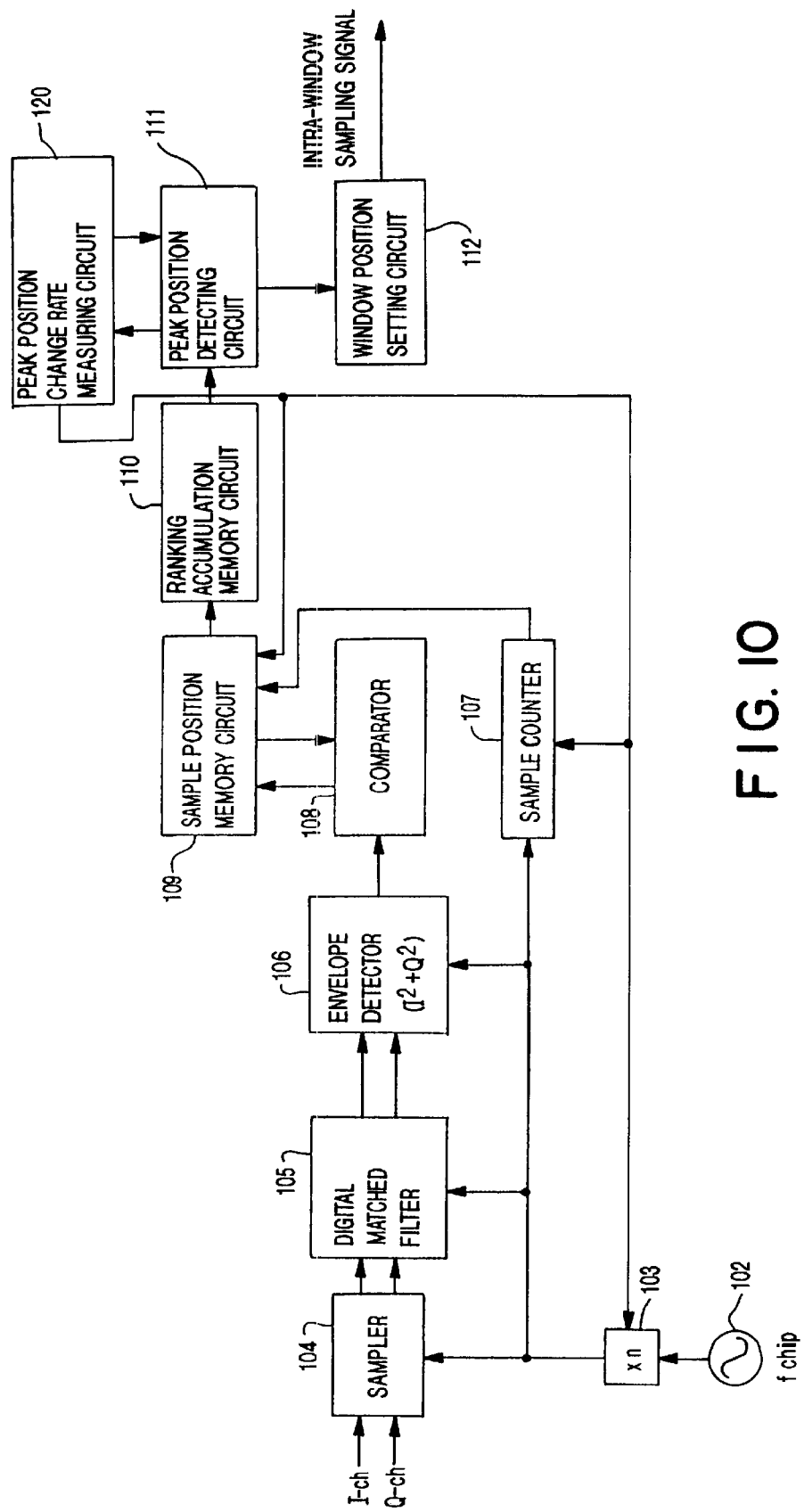
FIG. 10 is a block diagram of a synchronizing circuit device in embodiment 7 of the invention.

Embodiment 7 of the invention is described below. In this embodiment, in order to enhance the synchronization capture and holding performance of embodiment 1, the operating time of the sampler is varied depending on the time change rate of the peak position as shown in FIG. 10. The operating speed up to the sample position memory circuit 109 is changed at the same time, by adding a peak position change rate measuring circuit 120, thereby changing the period for counting the number of times the sample positions are stored in the sequence from the greater envelope detection output. The other parts are the same as the parts in FIG. 1, and are identified with the same reference numerals. The PDI receiver 201 is not shown in FIG. 10.

The operation of the embodiment is described below. The basic operation is same as in embodiment 1 of FIG. 1. In addition, the time change rate of the peak position is measured by the peak position change rate measuring circuit 120 from the output of the peak position detecting circuit 111. For example, when the peak position is stabilized, it is regarded as a favorable transmission path condition or stationary mode, and it is controlled to drop the sample period (i.e., to reduce n of the sampling clock generator 103). Or, when the peak position is unstable, the transmission path condition is poor and many undesired peaks are formed, or it is considered to be unstable due to the initial mode, and hence it is controlled to increase the sample period (i.e., to increase n of the sampling clock generator 103). Simultaneously with the change of the sample period, the operation speed up to the sample position memory circuit 109 is also changed, and the cyclic period of the sample counter 107 and data transmission timing of the sample position memory circuit 109 are changed at the same time. Consequently, depending on the transmission path condition or operation mode, it is effective to operate to capture or hold the synchronization accurately and stably.

(Embodiment 8)

Figure 11:
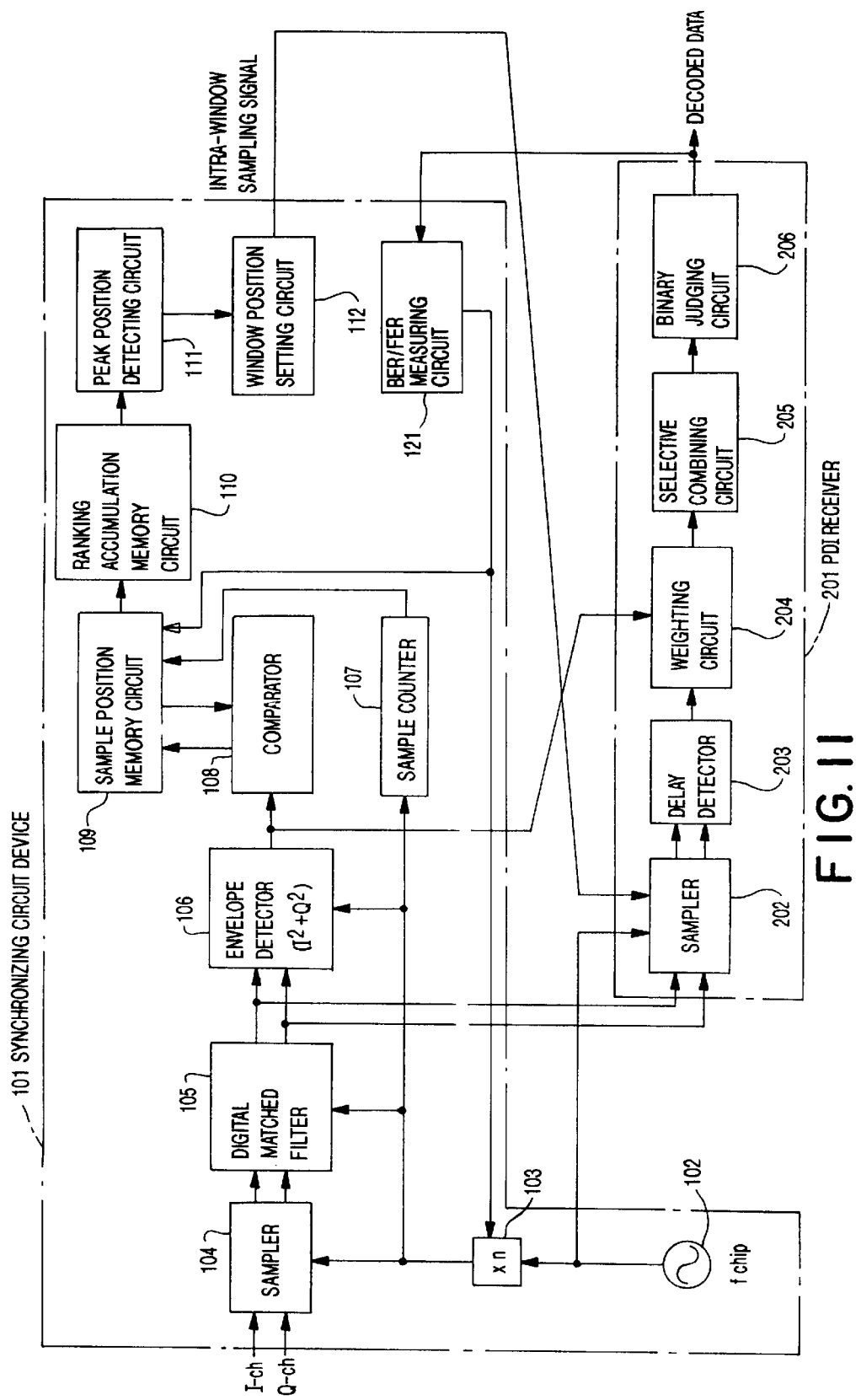
FIG. 11 is a block diagram of a synchronizing circuit device and PDI receiver in embodiment 8 of the invention.

Embodiment 8 of the invention is described below. In the embodiment, in order to enhance the synchronism capturing or holding performance, of embodiment 1, a BER/FER measuring circuit 121 is provided, as shown in FIG. 11. In order to vary the operating speed of the sampler by the error rate of the decoded data, and change the operating speed up to the sample position memory circuit 109 at the same time, the period for counting the sample position stored in the sample position memory circuit 109 in the ranking accumulation memory circuit 110 is changed. The other parts are the same as the parts in FIG. 1, and are identified with the same reference numerals.

The operation of the embodiment is described below. The basic operation is same as in embodiment 1 of FIG. 1. As shown in FIG. 13, when transmitting in the frame unit, an error detection code such as CRC is added to the transmission data (TCH) when transmitting, and at the reception side, by detecting a CRC error from the decoded data, the frame error can be detected. On the basis of the error rate measured in the BER/FER measuring circuit 121, for example, when the peak position is stable, it is regarded as a favorable transmission path condition or stationary mode, and it is controlled to reduce the sample period (i.e., to reduce n of the sampling clock generator 103). Or, when the peak position is unstable, the transmission path condition is poor and many undesired peaks are formed, or it is considered to be unstable due to the initial mode, and hence it is controlled to increase the sample period (to increase n of the sampling clock generator 103). Simultaneously with the change of sample period, the operation speed up to the sample position memory circuit 109 is also changed, and the cyclic period of the sample counter 107 and data transmission timing of the sample position memory circuit 109 are changed at the same time. Consequently, depending on the transmission path condition or operation mode, it is effective to operate to capture or hold the synchronization accurately and stably.

(Embodiment 9)

Figure 12:
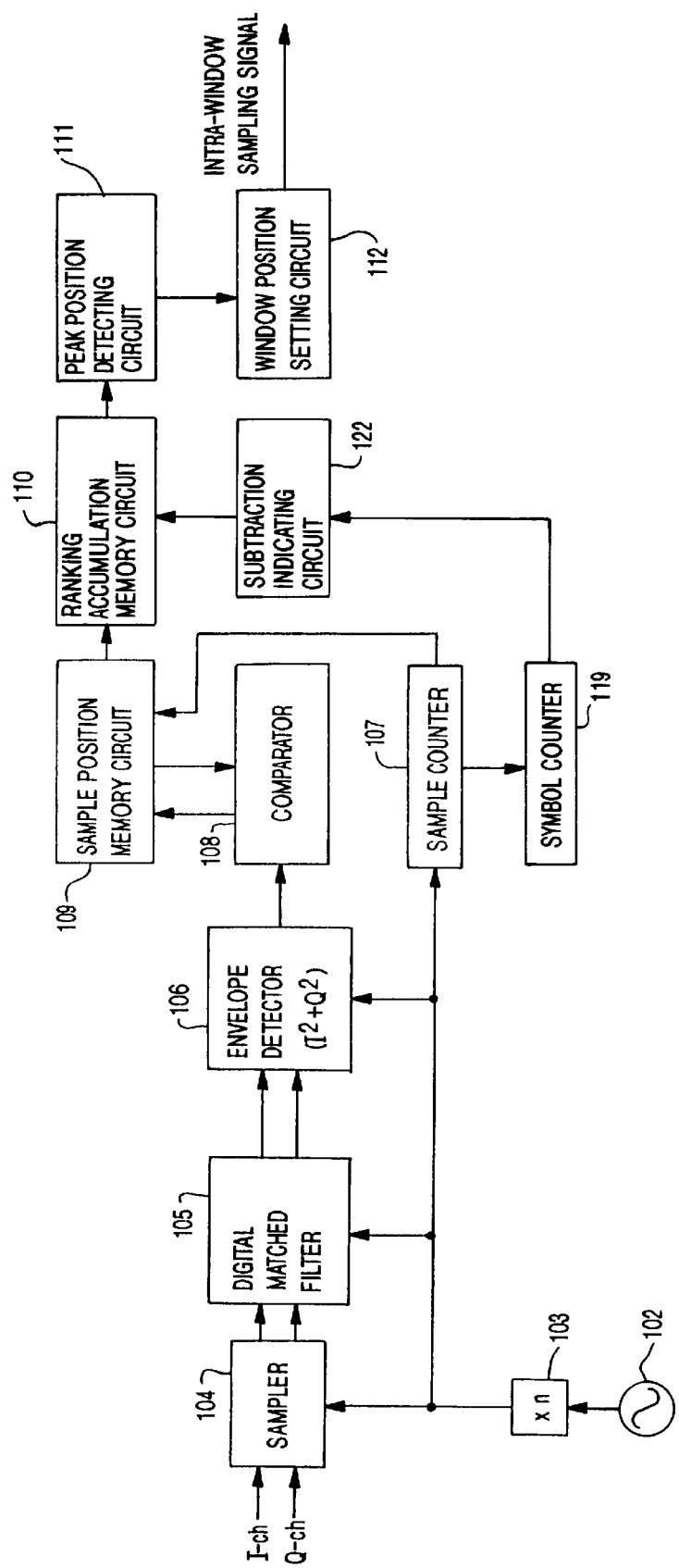
FIG. 12 is a block diagram of a synchronizing circuit device in embodiment 9 of the invention.

Embodiment 9 of the invention is described below. In embodiment 1, the large sample position in the envelope detection output is sent out and counted in the ranking accumulation memory circuit 110 in every symbol period. However, when the ranking accumulation memory circuit 110 is constituted as shown in FIG. 4, the size of the counter 110a is limited, and if overflowing, a correct result cannot be obtained in the peak position detection circuit 111. Or, if provided with too large a counter, although the correct peak position in the reception signal has already been changed due to the propagation condition changing moment by moment, the effect of the former ranking result is excessively left over in the ranking accumulation memory circuit 110. As a result, when the sample position of the largest number of times of the memory is detected as the peak position in the peak position detecting circuit 111, it may fail to follow up the actual change of the peak position and the performance may deteriorate. In the embodiment, accordingly, in order to enhance the following performance to the peak position change, as shown in FIG. 12, a symbol counter 119 and a subtraction indicating circuit 122 are added to the synchronizing circuit device of FIG. 1. The other parts are the same as the parts in FIG. 1, and are identified with the same reference numerals. The PDI receiver 201 is not shown in FIG. 12.

The operation of the embodiment is described below. The basic operation is same the as in embodiment 1 of FIG. 1. The subtraction indicating circuit 122 instructs subtraction to the ranking accumulation memory circuit 110 when the number of symbols counted by the symbol counter 119 becomes a certain value and, upon receiving the subtraction instruction, the ranking accumulation memory circuit 110 subtracts a predetermined value from each counting number of all samples stored. As a result, in the ranking accumulation memory circuit 110, there is no old ranking result, and hence the performance to the peak position change is enhanced, and overflow of the ranking accumulation memory circuit 110 prevented, so that it is effective to operate to capture or hold the synchronization accurately and stably.

Meanwhile, the subtraction indicating circuit 122 instructs subtraction to the ranking accumulation memory circuit 110 in every certain period, and does not count the number of samples. Therefore, it is evident that the number of samples or number of frames may be counted.

(Embodiment 10)

Figure 14:
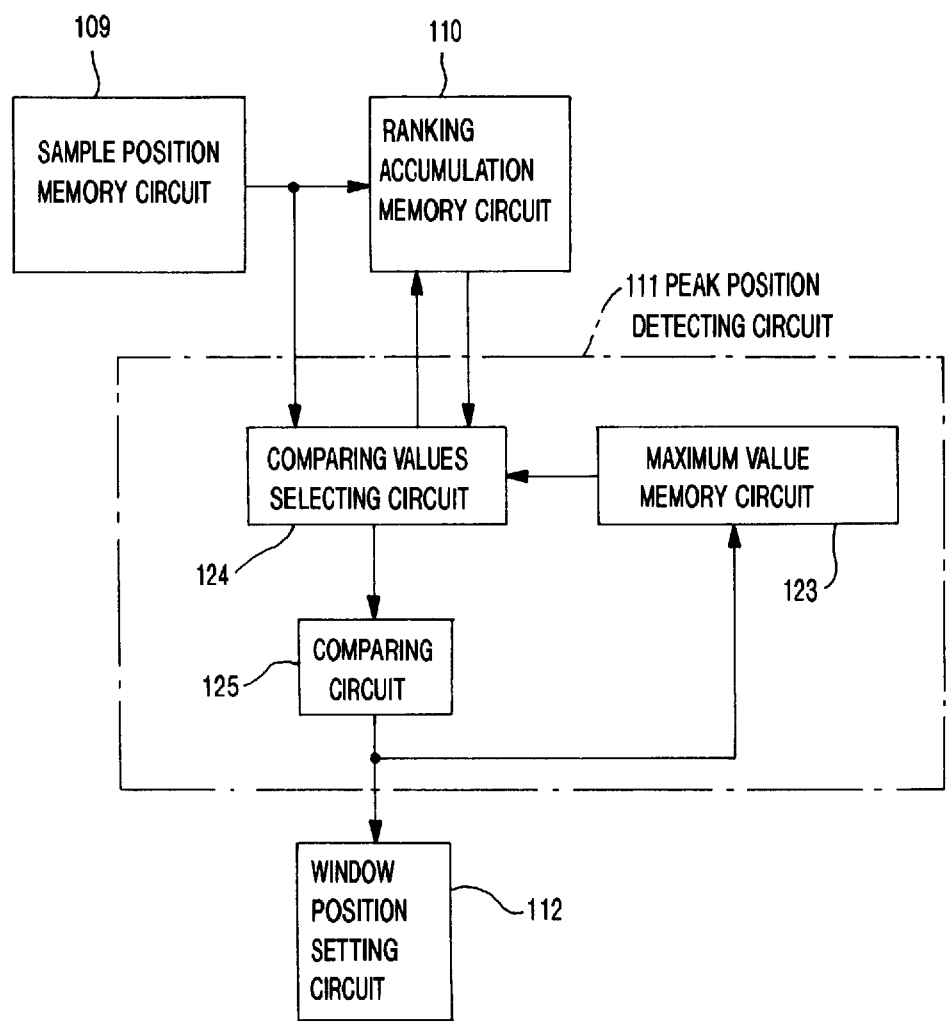
FIG. 14 is a block diagram of a peak position detection circuit and its surrounding circuit in embodiment 10 of the invention.

Embodiment 10 of the invention is described below. In embodiment 1, the large sample position in the envelope detection output is sent out from the sample position memory circuit 109 and counted in the ranking accumulation memory circuit 110 in every symbol period, and the sample number of the maximum count value in the ranking accumulation memory circuit 110 is detected as the peak position. In the embodiment, in order to reduce the number of compare times for detecting the maximum value from the ranking accumulation memory circuit 110, as shown in FIG. 14, the peak position detection circuit 111 of FIG. 1 is made up of a maximum value memory circuit 123, a comparing values selecting circuit 124 and a comparing circuit 125.

The operation of the embodiment is described below. The basic operation is same as in embodiment 1 of FIG. 1. The ranking accumulation memory circuit 110 counts up to m (m is the number of ranking memory stages) of the sample number sent from the sample position memory circuit 109 in every symbol period. The peak position detecting circuit 111 detects the maximum value from the output of the ranking accumulation memory circuit 110, and in this stage of the symbol period, the maximum value detected by the peak position detecting circuit 111 is the sample number detected as the peak position in one symbol period prior or the sample number counted up in the symbol period of this stage.

The comparing values selecting circuit 124 selects m+1 counted values of the sample numbers which are detected as the peak position before one symbol period and memorized in the maximum value memory circuit 123, and the m sample numbers from the sample position memory circuit 109. The comparing circuit 125 compares the m+1 counted values, and supplies the sample number of maximum counted value to the window position setting circuit 112 as a peak position detected result. The sample number of the maximum counted value is also memorized in the maximum value memory circuit 123.

As described above, the numbers of the comparing times in the peak position detection circuit 111 is reduced to m+1 times.

What is claimed is:

1. A spread spectrum communication synchronization apparatus for use with a spread spectrum signal comprising:

sampling means for sampling a received spread spectrum signal during a symbol period, said received signal modulated by data and having a spreading code, correlating means for correlating the sampled received signal from said sampling means and providing a correlated signal, detecting means for detecting an envelope of the correlated signal and generating a plurality of sample positions based on said symbol period, peak detecting means for detecting a peak position which corresponds to one of said plurality of sample positions corresponding to a largest magnitude during said symbol period, window setting means for setting and holding a symbol period window based on the peak position detected by said peak detecting means; and sample position memory means coupled to said detecting means for storing said plurality of sample positions.

2. A spread spectrum communication synchronization apparatus of claim 1, wherein said sample position memory means stores said plurality of sample positions in a descending order based on a magnitude corresponding to each of said plurality of sample positions.

3. A spread spectrum communication synchronization apparatus of claim 1, wherein said peak detecting means includes:

ranking means coupled to said sample position memory means for ranking said plurality of sample positions stored in said sample position memory means and for storing a predetermined number of largest ranked positions of said plurality of positions stored in said memory means, said ranking means coupled to said window setting means.

4. A spread spectrum communication synchronization apparatus of claim 3, further comprising:

means for varying the number of sample positions stored in said sample position memory means based on at least one of an error rate of decoded data and the number of sample positions stored in each symbol period in the ranking means.

5. A spread spectrum communication synchronization apparatus of claim 1, further comprising:

means for reducing the quantity of said plurality of sample positions stored in said sample position memory means if the quantity of said plurality of sample positions exceeds a predetermined value.

* * * * *